(12) United States Patent
Subbiah et al.

(10) Patent No.: US 11,991,208 B2
(45) Date of Patent: May 21, 2024

(54) SECURE FIBRE CHANNEL/NVME FABRIC COMMUNICATION SYSTEM

(71) Applicant: Dell Products L.P., Round Rock, TX (US)

(72) Inventors: Ramesh Kumar Subbiah, Chennai (IN); Vibin Varghese, Chennai (IN)

(73) Assignee: Dell Products L.P., Round Rock, TX (US)

( * ) Notice: Subject to any disclaimer, the term of this patent is extended or adjusted under 35 U.S.C. 154(b) by 351 days.

(21) Appl. No.: 17/107,624

(22) Filed: Nov. 30, 2020

(65) Prior Publication Data

US 2022/0174094 A1 Jun. 2, 2022

(51) Int. Cl.
| | |
|---|---|
| *H04L 9/40* | (2022.01) |
| *G06F 3/06* | (2006.01) |
| *G06F 21/79* | (2013.01) |
| *H04L 49/356* | (2022.01) |

(52) U.S. Cl.
CPC .......... *H04L 63/162* (2013.01); *G06F 3/0622* (2013.01); *G06F 3/0659* (2013.01); *G06F 3/067* (2013.01); *G06F 3/0679* (2013.01); *G06F 21/79* (2013.01); *H04L 49/357* (2013.01); *H04L 63/083* (2013.01)

(58) Field of Classification Search
CPC ... H04L 63/162; H04L 49/357; H04L 63/083; G06F 3/0622; G06F 3/0659; G06F 3/067; G06F 3/0679; G06F 21/79
See application file for complete search history.

(56) References Cited

U.S. PATENT DOCUMENTS

| | | | |
|---|---|---|---|
| 8,683,170 B1 * | 3/2014 | Patnaik | G06F 3/067 |
| | | | 711/170 |
| 9,965,363 B2 * | 5/2018 | Lalsangi | G06F 11/1658 |
| 11,079,939 B1 * | 8/2021 | Puttagunta | G06F 13/4022 |
| 11,113,001 B2 * | 9/2021 | Satapathy | G06F 3/0659 |

(Continued)

OTHER PUBLICATIONS

Clark, Tom; Designing Storage Area Networks: A Practical Reference for Implementing Fibre Channel and IP SANs, Second Edition Addison-Wesley Professional 2003 (Year: 2003).*

(Continued)

*Primary Examiner* — Tae K Kim
*Assistant Examiner* — Robert Matijasec
(74) *Attorney, Agent, or Firm* — Joseph Mencher

(57) ABSTRACT

A secure FC NVMe fabric communications system includes a host device having host WWPNs associated with each of its host NQNs, an NVMe target device having a target WWPNs associated with each of its target NQNs, and FC networking device(s) that couple the host device to the NVMe target device. The FC networking device(s) perform, for each host WWPN associated with the host NQNs, host login operations that register the host NQN for that host WWPN as an NVMe host, and perform, for each target WWPN associated with the target NQNs, target login operations that register the target NQN associated with that target WWPN as an NVMe target. The FC networking device(s) then provide, to the host for each host NQN, target NQN details for target NQN(s) zoned for communication with that host NQN to allow respective communication session(s) to be established between the host NQN and those target NQN(s).

20 Claims, 11 Drawing Sheets

(56) References Cited

U.S. PATENT DOCUMENTS

| | | | |
|---|---|---|---|
| 11,226,773 B1* | 1/2022 | Patel | G06F 3/0664 |
| 11,442,652 B1* | 9/2022 | Dailey | H04L 67/1097 |
| 11,463,521 B2* | 10/2022 | White | H04L 41/0893 |
| 2021/0124695 A1* | 4/2021 | Jaiswal | G06F 3/0632 |
| 2022/0030062 A1* | 1/2022 | Jennings | H04L 69/16 |
| 2022/0155965 A1* | 5/2022 | Smith | G06F 3/067 |

OTHER PUBLICATIONS

INCITS 540-201x Fibre Channel—NVMe Rev 1.14; American National Standard for Information Technology ;Dec. 7, 2016 (Year: 2016).*

* cited by examiner

SECURE FIBRE CHANNEL/NVME FABRIC COMMUNICATION SYSTEM

BACKGROUND

The present disclosure relates generally to information handling systems, and more particularly to secure Fibre Channel communications between a host information handling system and Non-Volatile Memory Express (NVMe) target devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other host systems known in the art, are sometimes connected to NVMe target devices via Fibre Channel fabrics. In conventional Fibre Channel NVMe fabrics, any NVMe target device may include multiple subsystems that are accessible via a single N_Port WWPN, and host systems may include multiple host NVMe Qualified Names (NQNs) that are each used to identify a corresponding NVMe target device and/or subsystems in an NVMe target device with which they communicate via the Fibre Channel fabric. For example, network-connected NVMe storage devices may operate as target device for a host system, and each NVMe storage device may be identified by a respective target NQN, while any NVMe storage device may include multiple storage subsystems (e.g., storage partitions) that may each be identified by a respective target NQN as well. In such conventional Fibre Channel NVMe fabrics, a World Wide Port Name (WWPN) is provided for the physical port on the host system that is used to connect via the network to the NVMe target device (e.g, during a Fabric Login (FLOGI) process), and that same WWPN is utilized by the host system for accessing the NVMe target device(s) and/or NVME target device subsystems with each host NQN. As will be appreciated by one of skill in the art, the use of a single WWPN with multiple host NQNs presents security issues, as Fibre Channel communications performed for those different host NQNs must utilize the same Fibre Channel communication session, which prevents the use of "hard" zoning techniques to stop unauthorized access across different host/target NQN pairs.

Accordingly, it would be desirable to provide a Fibre Channel NVMe fabric communication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Fibre Channel networking engine that is configured to: perform, with a host device including a plurality of host Non-Volatile Memory express (NVMe) Qualified Names (NQNs) and a respective host World Wide Port Name (WWPN) associated with each host NQN, host login operations for each host WWPN associated with the plurality of host NQNs included in the host device, wherein the host login operations register the host NQN associated with that host WWPN as an NVMe host; perform, with an NVMe target device including a plurality of target NQNs and a respective target WWPN associated with each target NQN with the NVMe target device, target login operations for each target WWPN associated with the plurality of target NQNs included in the NVMe target device, wherein the target login operations register the target NQN associated with that target WWPN as an NVMe target; and provide, to the host device for each of the plurality of host NQNs included in the host device and based on zoning information, target NQN details for one or more target NQNs that are included in the NVMe target device and that are zoned for communication with that host NQN, wherein the target NQN details are configured to allow each of the plurality of host NQNs included in the host device to establish a respective communication session with the one or more target NQNs that are included in the NVMe target device and that are zoned for communication with that host NQN.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
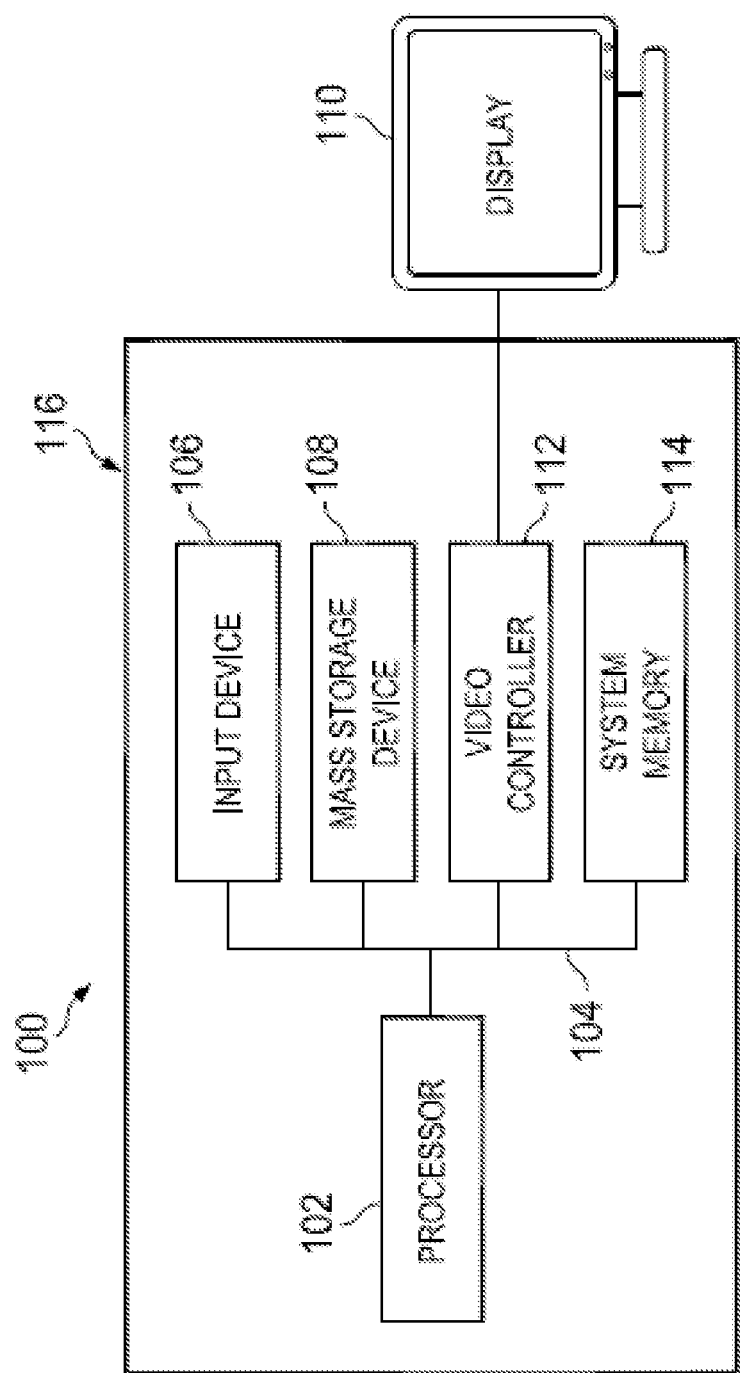
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
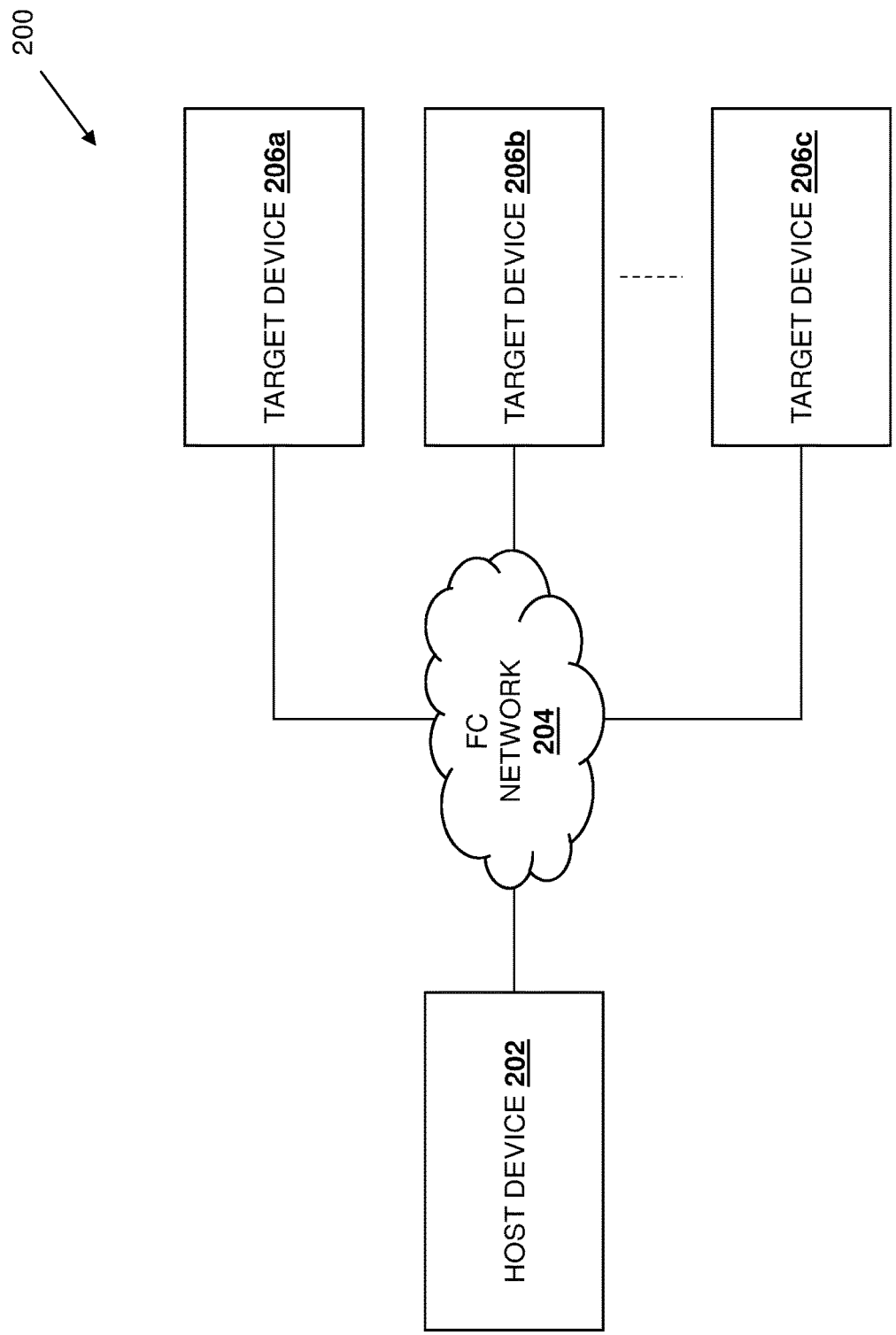
FIG. 2 is a schematic view illustrating an embodiment of a networked system that may provide the secure Fibre Channel NVMe fabric communications system of the present disclosure.

Referring now to FIG. 2, an embodiment of a networked system 200 is illustrated. In the illustrated embodiment, the networked system 200 includes a host device 202. In an embodiment, the host device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that host devices provided in the networked system 200 may include any devices that may be configured to operate similarly as the host device 202 discussed below. In the illustrated embodiment, the host device 202 is coupled to a Fibre Channel network 204 that may be provided by a variety of Fibre Channel fabric devices that would be apparent to one of skill in the art in possession of the present disclosure.

A plurality of target devices 206a, 206b, and up to 206c are coupled to the host device 202 via the Fiber Channel network 204, and in the examples discussed below are provided by Non-Volatile Memory express (NVMe) storage devices, although one of skill in the art in possession of the present disclosure will appreciate that other target devices may fall within the scope of the present disclosure as well. In the examples provided below, the host device 202 performs secure communications with multiple subsystems in the target device 206a, but one of skill in the art in possession of the present disclosure will appreciate that the secure Fibre Channel NVME fabric communication techniques described herein may be utilized to allow the host device 202 to perform secure communications with multiple target devices 206a, 206b, and up to 206c, or with multiple subsystems in multiple target devices 206a, 206b, and up to 206c while remaining within the scope of the present disclosure as well. However, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
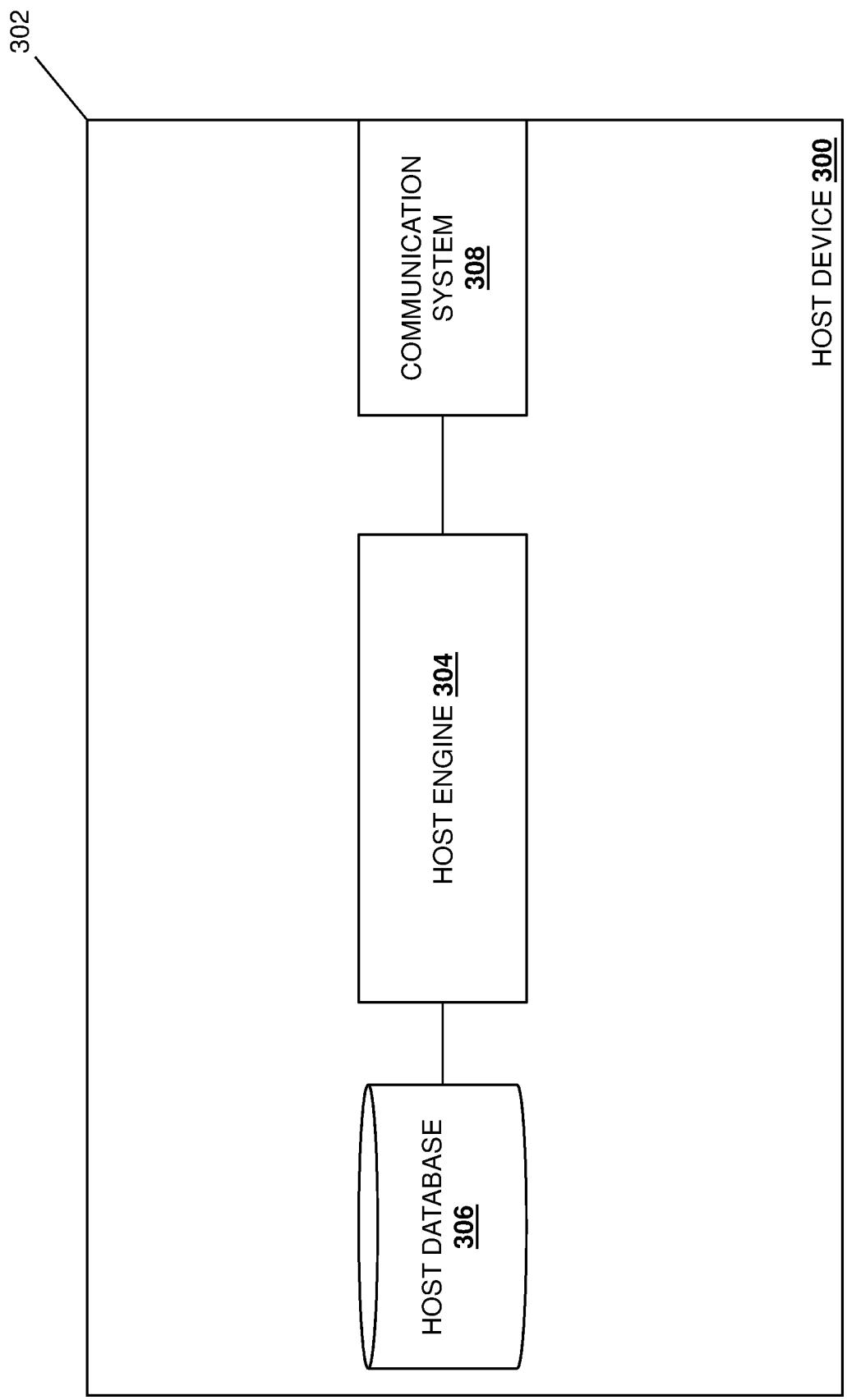
FIG. 3 is a schematic view illustrating an embodiment of a host device that may be included in the networked system of FIG. 2.

Referring now to FIG. 3, an embodiment of a host device 300 is illustrated that may provide the host device 202 discussed above with reference to FIG. 2. As such, the host device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the host device 300 discussed below may be provided by other devices that are configured to operate similarly as the host device 300 discussed below. In the illustrated embodiment, the host device 300 includes a chassis 302 that houses the components of the host device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a host engine 304 that is configured to perform the functionality of the host engines and/or host devices discussed below.

The chassis 302 may also house a storage system (not illustrated, but which may include the storage 108 discussed above with reference to FIG. 1) that is coupled to the host engine 304 (e.g., via a coupling between the storage system and the processing system) and that includes a host database 306 that is configured to store any of the information utilized by the host engine 304 discussed below. The chassis 302 may also house a communication system 308 that is coupled to the host engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific host device 300 has been illustrated, one of skill in the art in possession of the present disclosure will recognize that host devices (or other devices operating according to the teachings of the present disclosure in a manner similar to that described below for the host device 300) may include a variety of components and/or component configurations for providing conventional host device functionality, as well as the functionality discussed below, while remaining within the scope of the present disclosure as well.

Figure 4:
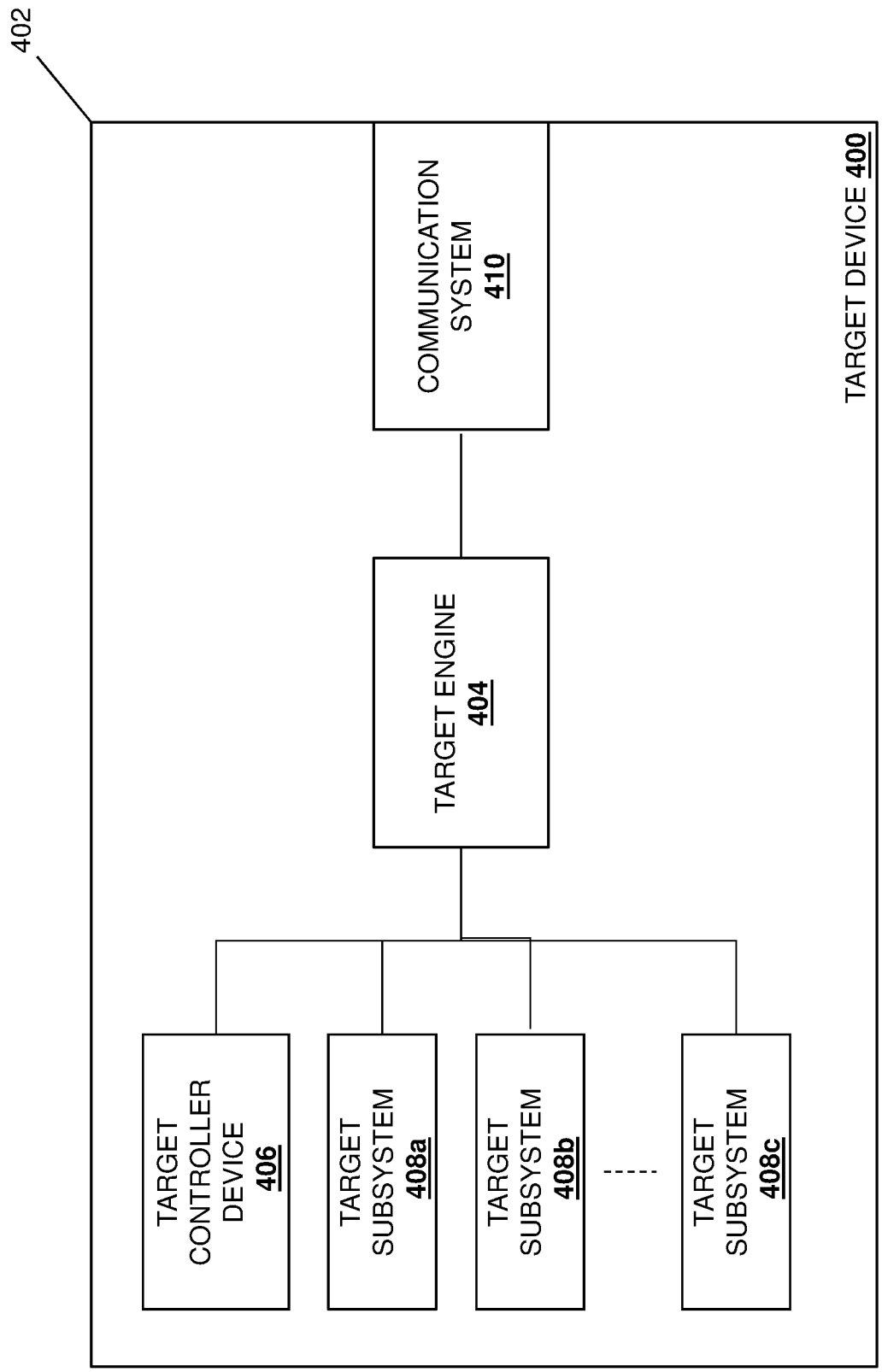
FIG. 4 is a schematic view illustrating an embodiment of a target device that may be included in the networked system of FIG. 2.

Referring now to FIG. 4, an embodiment of a target device 400 is illustrated that may provide any of the target devices 206a-206c discussed above with reference to FIG. 2. As such, the target device 400 may be provided by the IHS 100 discussed above with reference to FIG. 1 and/or may include some or all of the components of the IHS 100, and in specific examples may be provided by NVMe storage devices. However, while illustrated and discussed as being provided by NVMe storage devices, one of skill in the art in possession of the present disclosure will recognize that the functionality of the target device 400 discussed below may be provided by other devices that are configured to operate similarly as the target device 400 discussed below. In the illustrated embodiment, the target device 400 includes a chassis 402 that houses the components of the target device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a target engine 404 that is configured to perform the functionality of the target engines and/or target devices discussed below.

In the illustrated embodiment, the chassis 402 also houses a target controller device 406 and a plurality of target subsystems 408a, 408b, and up to 408c, each of which are coupled to the target engine 404 (e.g., via a coupling between the processing system and each of the target controller device 406 and the plurality of target subsystems 408a-408c). For example, the chassis 302 may house an NVMe storage system that includes a discovery controller that provides the target controller device 406, and storage subsystems (e.g., storage partitions) that provide the target subsystems 408a-408c. However, while examples of a target controller device and target subsystems are provided, one of skill in the art in possession of the present disclosure will appreciate that other target controller devices and target subsystems will fall within the scope of the present disclosure as well. The chassis 402 may also house a communication system 410 that is coupled to the target engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific target device 400 has been illustrated and described, one of skill in the art in possession of the present disclosure will recognize that target devices (or other devices operating according to the teachings of the present disclosure in a manner similar to that described below for the target device 400) may include a variety of components and/or component configurations for providing conventional target device functionality, as well as the functionality discussed below, while remaining within the scope of the present disclosure as well.

Figure 5:
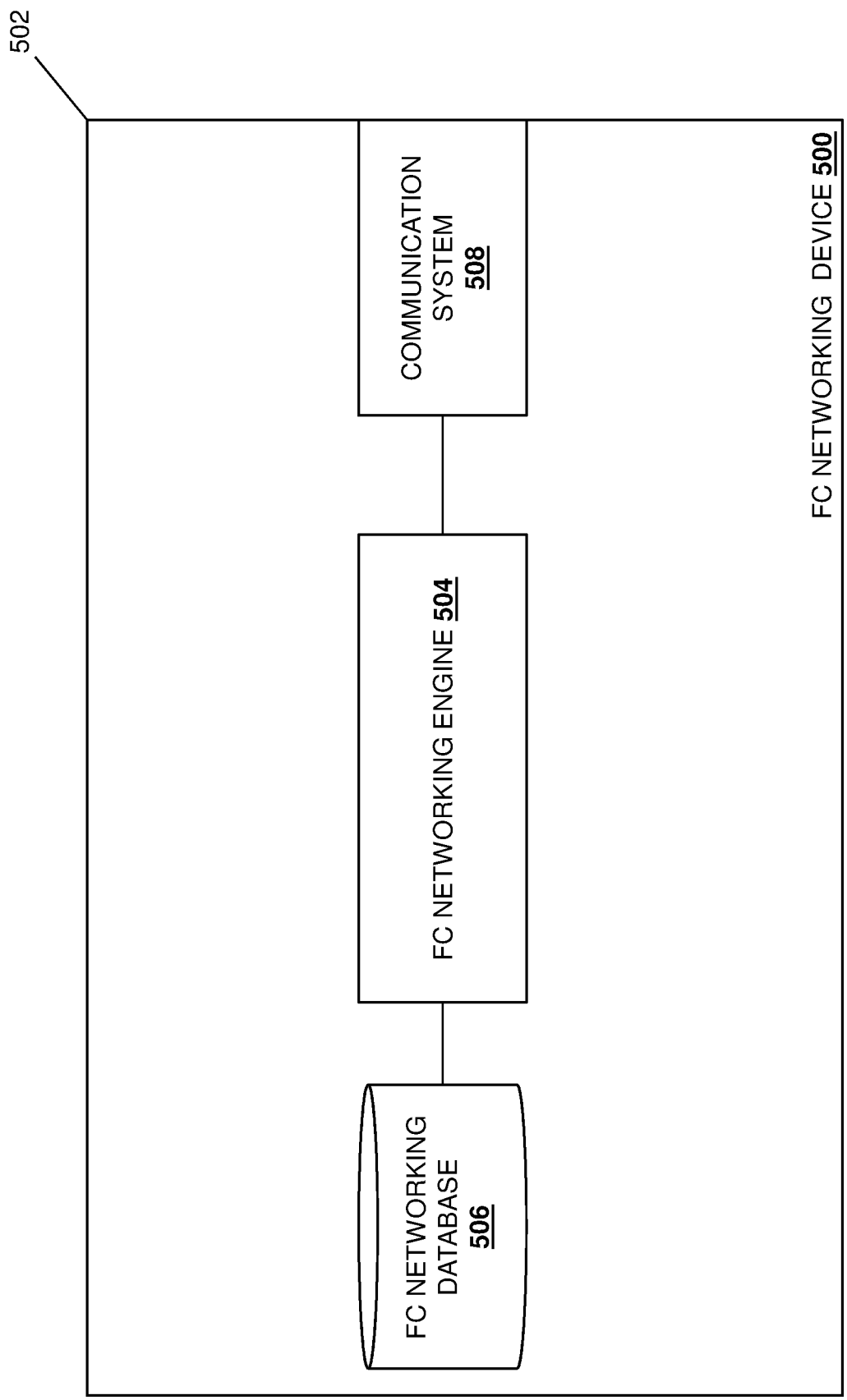
FIG. 5 is a schematic view illustrating an embodiment of a Fibre Channel networking device that may be included in the networked system of FIG. 2.

Referring now to FIG. 5, an embodiment of a Fibre Channel networking device 500 is illustrated that may provide the Fibre Channel network 204 discussed above with reference to FIG. 2. In an embodiment, the Fibre channel networking device 500 may be provided by the IHS 100 discussed above with reference to FIG. 1 and/or may include some or all of the components of the IHS 100, and in specific examples may be provided by a Fibre Channel switch device and/or other Fibre Channel fabric components known in the art. Furthermore, while illustrated and discussed as being provided by a Fibre Channel switch device, one of skill in the art in possession of the present disclosure will recognize that the functionality of the Fibre channel networking device 500 discussed below may be provided by other devices that are configured to operate similarly as the Fibre channel networking device 500 discussed below. In the illustrated embodiment, the Fibre channel networking device 500 includes a chassis 502 that houses the components of the Fibre channel networking device 500, only some of which are illustrated below. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Fibre Channel networking engine 504 that is configured to perform the functionality of the Fibre Channel networking engines and/or Fibre Channel networking devices discussed below.

The chassis 502 may also house a storage system (not illustrated, but which may include the storage 108 discussed above with reference to FIG. 1) that is coupled to the Fibre Channel networking engine 504 (e.g., via a coupling between the storage system and the processing system) and that includes a Fibre Channel networking database 506 that is configured to store any of the information utilized by the Fibre Channel networking engine 504 discussed below. The chassis 502 may also house a communication system 508 that is coupled to the Fibre Channel networking engine 504 (e.g., via a coupling between the communication system 508 and the processing system) and that may be provided by any of a variety of Fibre Channel communication components that would be apparent to one of skill in the art in possession of the present disclosure. However, while a specific Fibre Channel networking device 500 has been illustrated and described, one of skill in the art in possession of the present disclosure will recognize that Fibre Channel networking devices (or other devices operating according to the teachings of the present disclosure in a manner similar to that described below for the Fibre Channel networking device 500) may include a variety of components and/or component configurations for providing conventional Fibre Channel networking functionality, as well as the functionality discussed below, while remaining within the scope of the present disclosure as well.

Figure 6:
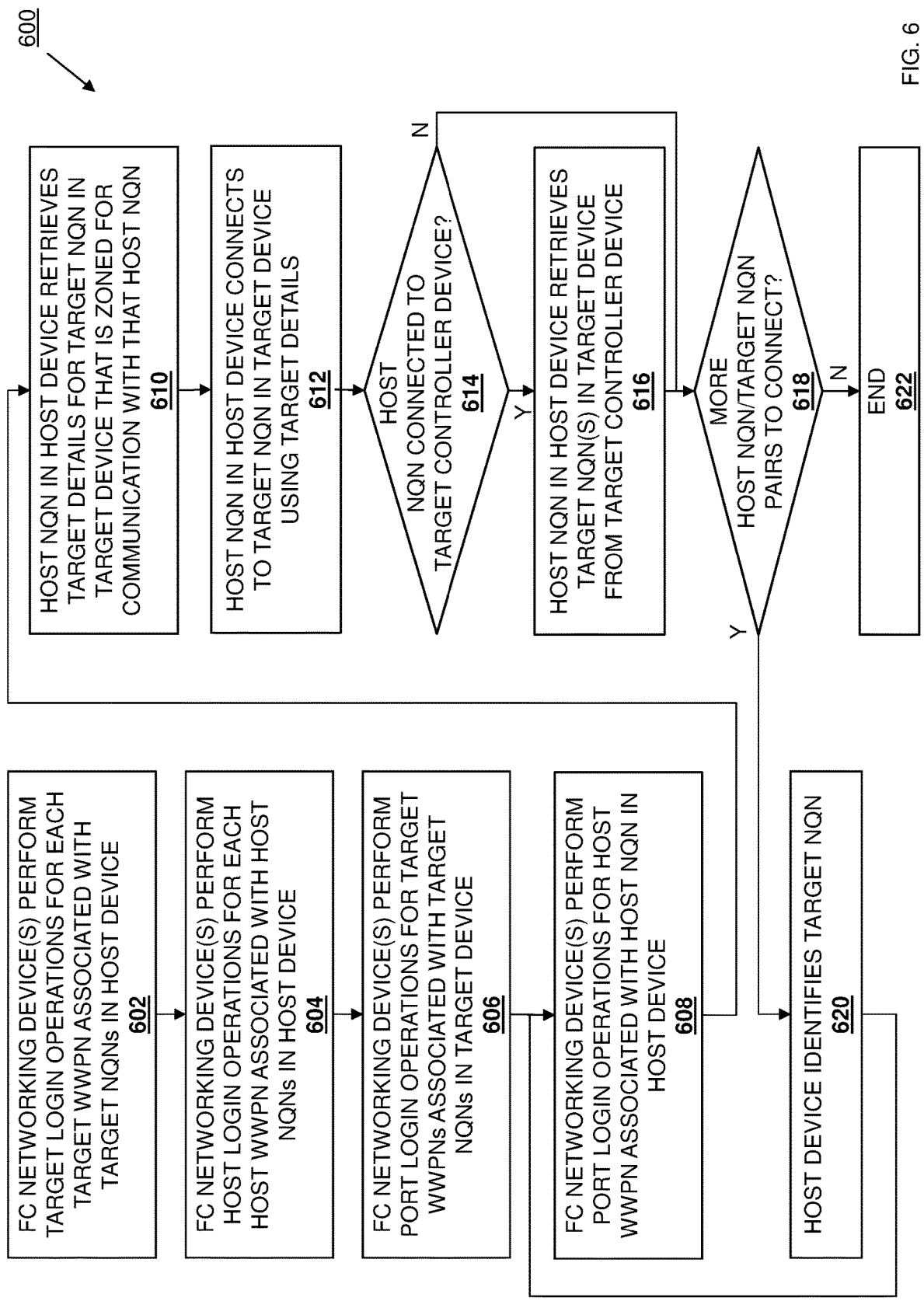
FIG. 6 is a flow chart illustrating an embodiment of a method for secure Fibre Channel NVMe fabric communications.

Referring now to FIG. 6, an embodiment of a method 600 for secure Fibre Channel NVMe fabric communications is illustrated. As discussed below, the systems and methods of the present disclosure provide a respective host WWPN for each host NQN included in a host device, and a respective target WWPN for each target NQN included in a target device, which allows a Fibre Channel fabric to perform respective logins for each host WWPN and target WWPN, and utilize zoning information to provide respective communication sessions for host NQN/target NQN pairs via their corresponding host WWPNs/target WWPNs. For example, the secure Fibre Channel NVMe fabric communications system of the present disclosure includes a host device having host WWPNs associated with each of its host NQNs, an NVMe target device having a target WWPNs associated with each of its target NQNs, and FC networking device(s) that couple the host device to the NVMe target device. The FC networking device(s) perform, for each host WWPN associated with the host NQNs, host login operations that register the host NQN for that host WWPN as an NVMe host, and perform, for each target WWPN associated with the target NQNs, target login operations that register the target NQN associated with that target WWPN as an NVMe target. The FC networking device(s) then provide, to the host for each host NQN, target NQN details for target NQN(s) zoned for communication with that host NQN to allow respective communication session(s) to be established between the host NQN and those target NQN(s). As such, different NQNs may utilize different Fibre Channel communication sessions to stop unauthorized access across different host/target NQN pairs.

Figure 7:
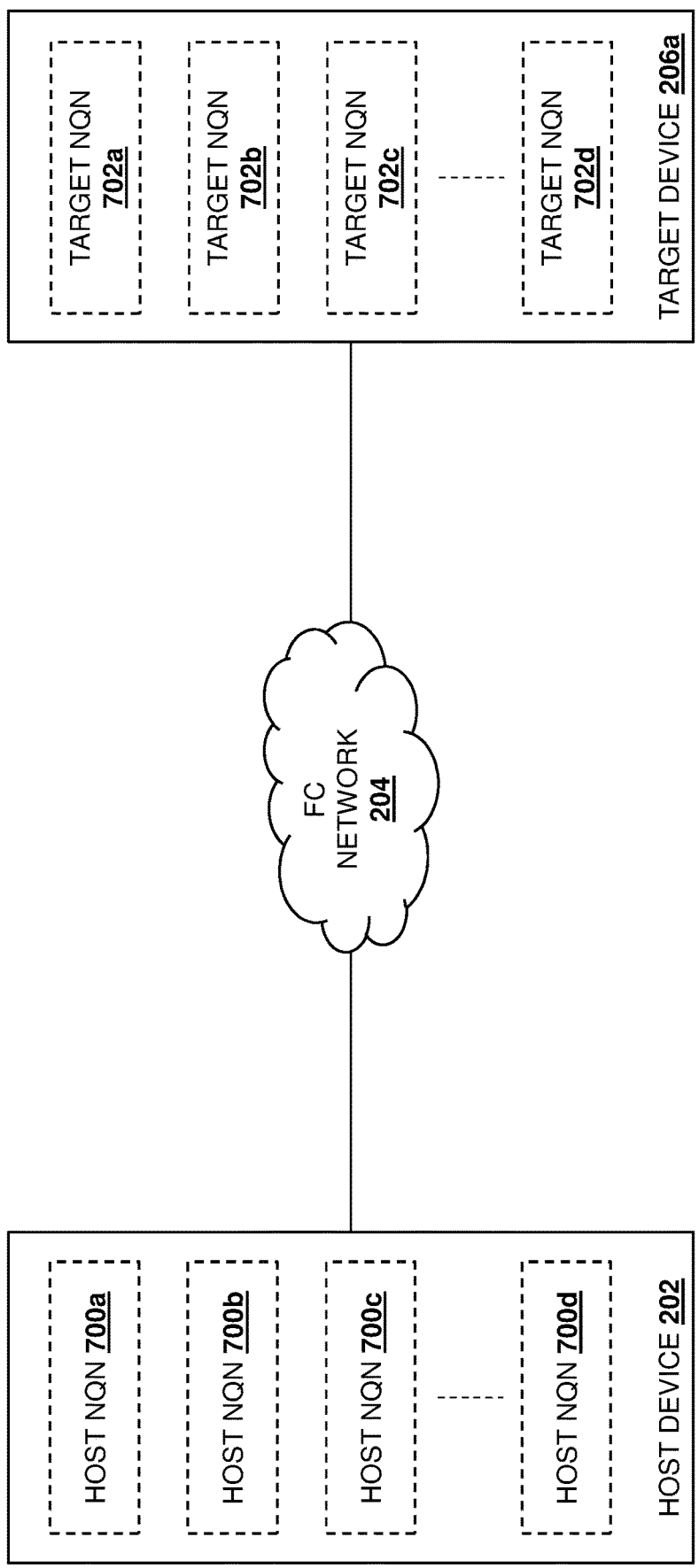
FIG. 7 is a schematic view illustrating an embodiment of the networked system of FIG. 2 operating during the method of FIG. 6.

In an embodiment, during or prior to the method 600, the host device 202/300 may be provided with a respective host WWPN for each host NQN included in that host device 202/300, and the target device 206a/400 may be provided with a respective target WWPN for each target NQN included in that target device 206a/400. With reference to FIG. 7 and for the purposes of the specific examples provided below, a network administrator and/or other user may configure the host device 202/300 with a plurality of host Non-Volatile Memory express (NVMe) Qualified Names (NQNs) 700a, 700b, 700c, and up to 700d that, as discussed below, may be used to communicate with devices and/or subsystems in the target device 206a/400 via the Fibre Channel network 204 in the examples provided herein. Similarly, the network administrator and/or other user may configure the target device 206a/400 with a plurality of target NQNs 702a, 702b, 702c, and up to 702d that, as discussed below, may be used with the host NQNs in the host device 202/300 to communicate with the host device 202/300 via the Fibre Channel network 204 in the examples provided herein. In the examples below, the target NQN 702a is associated with the target controller device 406, while the target NQNs 702b, 702c, and up to 702d are associated with the target subsystems 408a, 408b, and up to 408c. However, as discussed above, while the examples herein provide a host device using multiple host NQNs to communicate with multiple particular devices/subsystems in a single target device using multiple target NQNs, one of skill in the art in possession of the present disclosure will appreciate that a host device may use multiple host NQNs to communicate with one or more of a variety of other devices/subsystems in each of a plurality of target devices using multiple target NQNs while remaining within the scope of the present disclosure as well.

Figure 8:
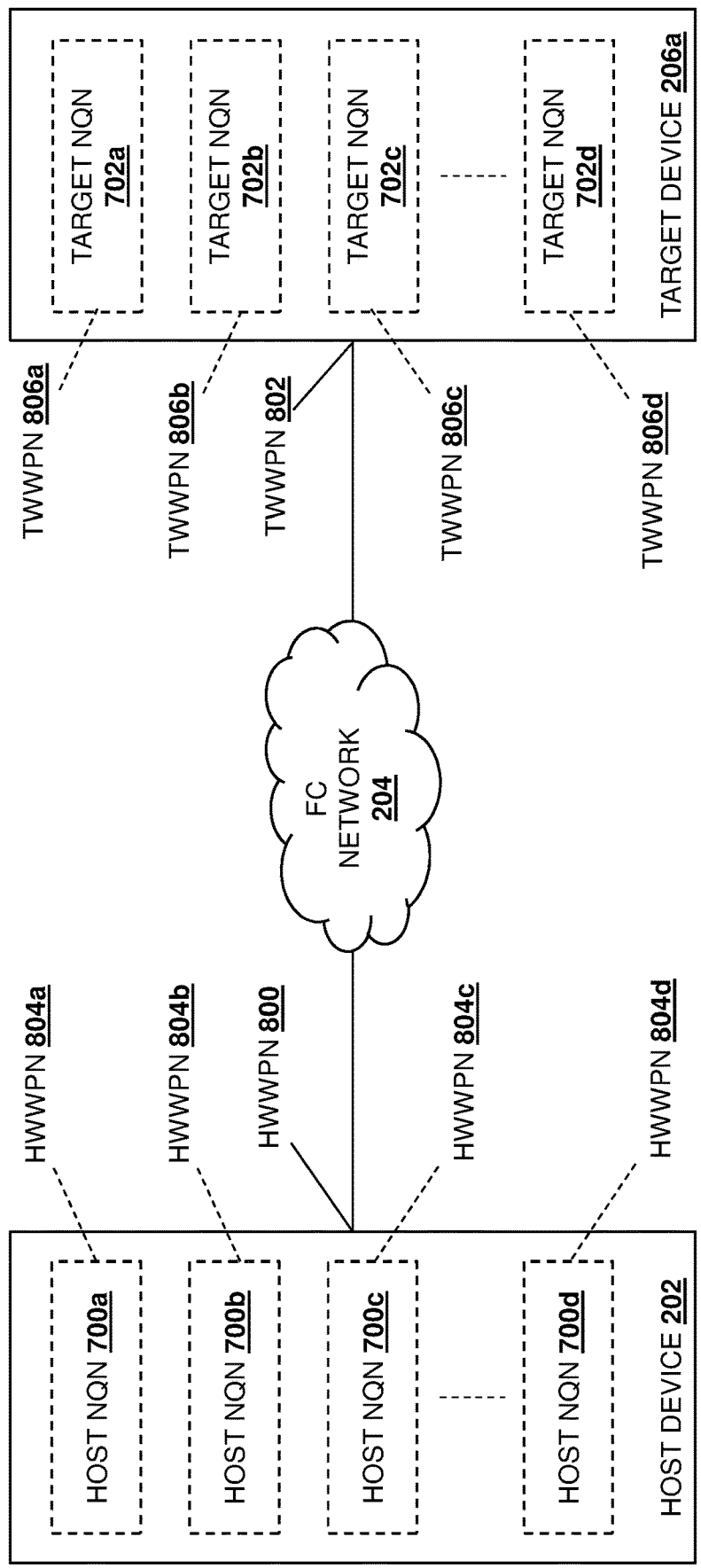
FIG. 8 is a schematic view illustrating an embodiment of the networked system of FIG. 2 operating during the method of FIG. 6.

With reference to FIG. 8 and for the purposes of the specific examples provided below, the network administrator and/or other user may provide a host World Wide Port Name (WWPN) (HWWPN) 800 for a physical port on the host device 202 (e.g., a host physical N_port), and a target WWPN (TWWPN) 802 for a physical port on the target device 206a (e.g., a target physical N_port). Furthermore, the network administrator and/or other user may also provide a respective host WWPN (HWWPN) 804a, 804b, 804c, and up to 804d for each host NQN 700a, 700b, 700c, and up to 700d, respectively. Similarly, the network administrator and/or other user may also provide a respective target WWPN (TWWPN) 806a, 806b, 806c, and up to 806d for each target NQN 702a, 702b, 702c, and up to 702d, respectively.

The method 600 begins at block 602 where Fibre Channel networking device(s) perform target login operations for each target WWPN associated with target NQNs in a target device, and then proceeds to block 604 where the Fibre Channel networking device(s) perform host login operations for each host WWPN associated with host NQNs in a host device. In an embodiment, during or prior to the method 600, the Fibre Channel networking engine 504 in the networking device 500 that provides the FC network 204 may receive zoning information that associates pairs of the host WWPNs and target WWPNs discussed above (which are associated with corresponding pairs the host NQNs and target NQNs as discussed above) to identify which host NQN/target NQN pairs are allowed to communicate with each other, and may store that zoning information in its Fibre Channel networking database 506.

As such, using the simplified example discussed in further detail below, the zoning information that is received and stored by the Fibre Channel networking engine 504 included in the networking device 500 that provides the FC network 204 and that associates pairs of host WWPNs and target WWPNs (for host NQNs and target NQNs that may communicate with each other) may include zoning information that allows the host NQN 700a to communicate with the target NQN 702a (e.g., "HWWPN 804a/TWWPN 806a" zoning information), zoning information that allows the host NQN 700b to communicate with the target NQN 702b (e.g., "HWWPN 804b/TWWPN 806b" zoning information), zoning information that allows the host NQN 700c to communicate with the target NQN 702c (e.g., "HWWPN 804c/TWWPN 806c" zoning information), and zoning information that allows the host NQN 700d to communicate with the target NQN 702d (e.g., "HWWPN 804d/TWWPN 806d" zoning information). However, while a specific example is provided, one of skill in the art in possession of the present disclosure will appreciate that zoning information may allow communications between any host NQN/target NQN pairs while remaining within the scope of the present disclosure as well.

Figure 9A:
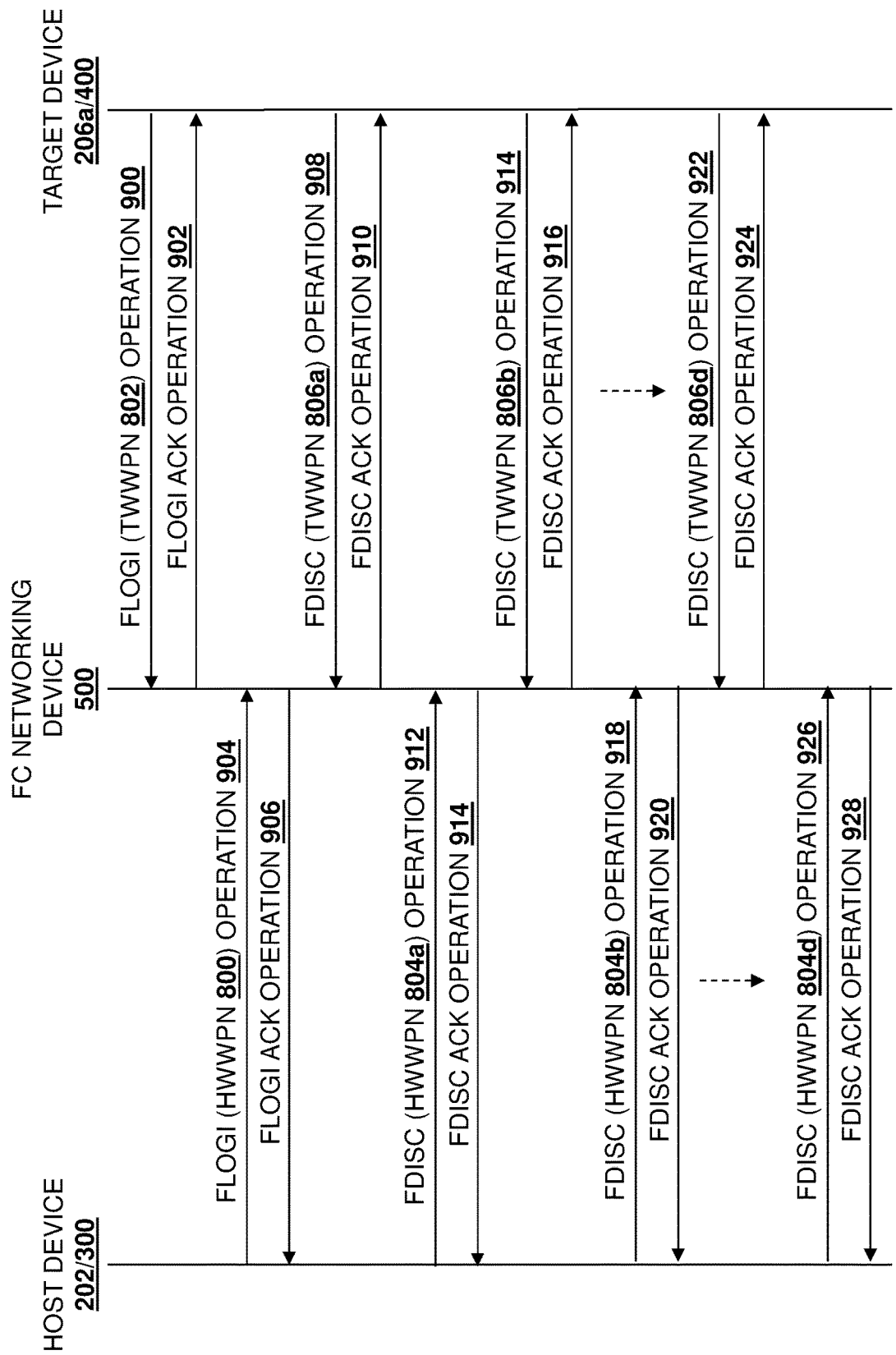
FIG. 9A is a portion of a swim lane diagram illustrating an embodiment of the networked system of FIG. 2 operating during the method of FIG. 6.

As such, with reference to FIG. 9A and in an embodiment of blocks 602 and 604, the Fibre Channel networking engine 504 in the networking device 500 that provides the FC network 204 may perform host login operations for each host WWPN 804a, 804b, 804c and up to 804d associated with the host NQNs 700a, 700b, 700c, and up to 700d, respectively, in the host device 202/300, and may perform target login operations for each target WWPN 806a, 806b, 804c and up to 806d associated with the target NQNs 702a, 702b, 702c, and up to 702d, respectively, in the target device 206a/400. Furthermore, in some examples, the target engine 404 in the target device 206a/400 may perform fabric login (FLOGI) operations 900 for the target WWPN 802 that was provided for the target physical N_port on the target device 206a/400 and that may include generating and transmitting a FLOGI via its communication system 308 to the Fibre Channel networking device 500, and the Fibre Channel networking engine 504 in the networking device 500 receiving that FLOGI via its communication system 508. The Fibre Channel networking engine 504 in the networking device 500 may then perform FLOGI acknowledgment (FLOGI ACK) operations 902 that may include generating and transmitting a FLOGI ACK via its communication system 508 to the target device 206a/400, and the target engine 404 in the target device 206a/400 receiving that FLOGI ACK via its communication system 308, which one of skill in the art in possession of the present disclosure will recognize operate to log the target WWPN 802 into a dedicated communication session that is associated with that target WWPN 802 that allows communications via the Fibre Channel fabric.

Similarly, in some examples, the host engine 304 in the host device 202/300 may perform FLOGI operations 904 for the host WWPN 800 that was provided for the host physical N_port on the host device 202 and that may include generating and transmitting a FLOGI via its communication system 308 to the Fibre Channel networking device 500, and the Fibre Channel networking engine 504 in the networking device 500 receiving that FLOGI via its communication system 508. The Fibre Channel networking engine 504 in the networking device 500 may then perform FLOGI ACK operations 906 that may include generating and transmitting a FLOGI ACK via its communication system 508 to the host device 202/300, and the host engine 304 in the host device 202/300 receiving that FLOGI ACK via its communication system 308, which one of skill in the art in possession of the present disclosure will recognize operate to log the host WWPN 800 into a dedicated communication session that is associated with that host WWPN 800 and that allows communications via the Fibre Channel fabric. However, while the host physical N_port on the host device 202/300 and target physical N_port on the target device 206a/400 are described above as logging into respective communications sessions for the Fibre Channel fabric using FLOGIs, one of skill in the art in possession of the present disclosure will appreciate that those FLOGIs may instead be utilized to log a host NQN and/or target NQN (e.g., the target NQN for the target controller device 406 discussed below) into a communication session for the Fibre Channel fabric while remaining within the scope of the present disclosure as well.

In an embodiment and as part of block 602, the target engine 404 in the target device 206a/400 may perform fabric discovery (FDISC) operations 908 for the target WWPN 806a that was provided for the target NQN 702a included in the target device 206a/400 (which is associated with the target controller device 406 in the examples below), and those FDISC operations 908 may include generating and transmitting an FDISC via its communication system 308 to the Fibre Channel networking device 500, and the Fibre Channel networking engine 504 in the networking device 500 receiving that FDISC via its communication system 508. The Fibre Channel networking engine 504 in the networking device 500 may then perform FDISC acknowledgment (FDISC ACK) operations 910 that may include generating and transmitting a FLOGI ACK via its communication system 508 to the target device 206a/400, and the target engine 404 in the target device 206a/400 receiving that FLOGI ACK via its communication system 308, which one of skill in the art in possession of the present disclosure will recognize operate to log the target WWPN 806a into a dedicated communication session that is associated with the target WWPN 806a that allows its corresponding target NQN 702a to communicate via the Fibre Channel fabric. In this example that includes the target NQN 702a/target WWPN 806a associated with the target controller device 406 that is provided by an NVMe discovery controller, the target WWPN 806a may also be utilized to register as an NVMe discovery controller with a name server in the Fibre Channel fabric that provides the Fibre Channel network 204.

Furthermore, one of skill in the art in possession of the present disclosure will appreciate that similar FDSIC operations and FDISC ACK operations may be performed by the target device 206a/400 and Fibre Channel networking device 500 for the remaining target WWPNs (e.g., the FDISC/FDISC ACK operations 914/916 and up to the FDISC/FDISC ACK operations 922/924 illustrated in FIG. 9A) in a similar manner in order to log the target WWPNs 806b, 806c, and up to 806d into respective, dedicated communication session that are associated with each of those target WWPNs and that each allow their corresponding target NQNs 702b, 702c, and up to 702d to communicate via the Fibre Channel fabric as well. In this example of the target NQNs 702b-702d/target WWPNs 806b-806d associated with the target subsystems 408a-408c that are provided by storage subsystems in an NVMe storage device, the target WWPNs 806b-806d may also be utilized to register those target NQNs 702b-702d as NVMe targets with a name server in the Fibre Channel fabric that provides the Fibre Channel network 204.

Similarly, as part of block 604, the host engine 304 in the host device 202/300 may perform FDISC operations 912 for the host WWPN 804a that was provided for the host NQN 700a included in the host device 202, and that may include generating and transmitting a FDISC via its communication system 308 to the Fibre Channel networking device 500, and the Fibre Channel networking engine 504 in the networking device 500 receiving that FDISC via its communication system 508. The Fibre Channel networking engine 504 in the networking device 500 may then perform FDISC ACK operations 914 that may include generating and transmitting an FDISC ACK via its communication system 508 to the host device 202/300, and the host engine 304 in the host device 202/300 receiving that FDISC ACK via its communication system 308, which one of skill in the art in possession of the present disclosure will recognize operate to log the host WWPN 804a into a dedicated communication session that is associated with the host WWPN 804a that allows its corresponding host NQN 700a to communicate via the Fibre Channel fabric. Furthermore, one of skill in the art in possession of the present disclosure will appreciate that similar FDSIC operations and FDISC ACK operations may be performed by the host device 202/300 and the Fibre Channel networking device 500 for the remaining host WWPNs (e.g., the FDISC/FDISC ACK operations 918/920 and up to the FDISC/FDISC ACK operations 926/928 illustrated in FIG. 9A) in a similar manner in order to log the host WWPNs 804b, 804c, and up to 804d into respective, dedicated communication session that are associated with each of those host WWPNs and that each allow that each allow their corresponding host NQNs 700b, 700c, and up to 700d to communicate via the Fibre Channel fabric as well. In this example of the host NQNs 700a-700d/host WWPNs 804a-804d, the host WWPNs 804a-804d may be utilized to register those host NQNs 700b-700d as NVMe hosts with a name server in the Fibre Channel fabric that provides the Fibre Channel network 204.

Figure 9B:
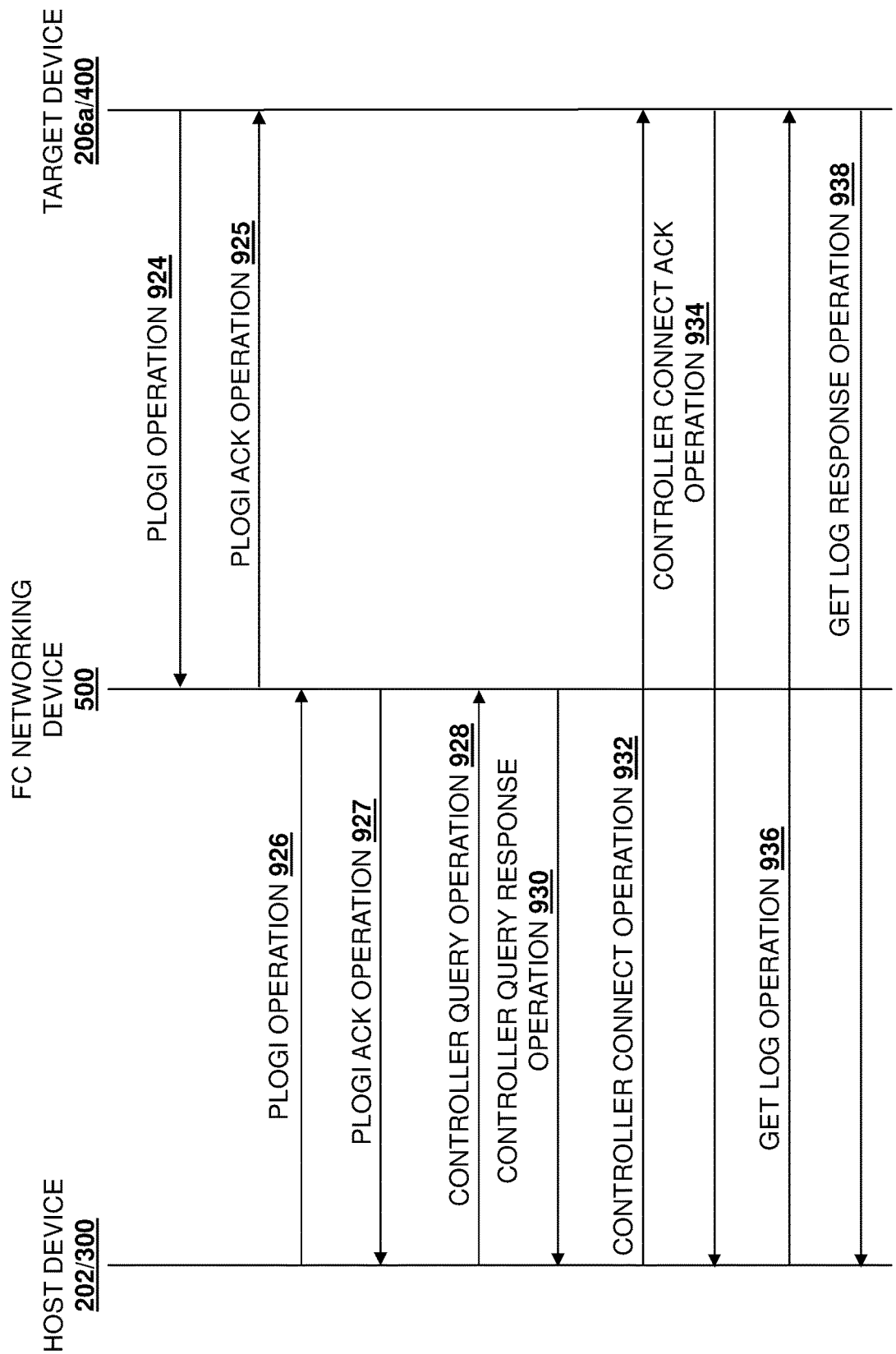
FIG. 9B is a portion of a swim lane diagram illustrating an embodiment of the networked system of FIG. 2 operating during the method of FIG. 6.

The method 600 may then proceed to block 606 where the Fibre Channel networking device(s) perform port login operations for target WWPNs associated with target NQNs in the target device. With reference to FIG. 9B, in an embodiment of block 608, the target engine 404 in the target device 206*a*/400 may perform port login (PLOGI) operations 924 for the target WWPNs 806*a*, 806*b*, 806*c*, and up to 806*d* associated with the target NQNs 702*a*, 702*b*, 702*c*, and up to 702*d* included in the target device 206*a*/400, and which may include generating and transmitting PLOGI(s) via its communication system 408 to a name server provided by the Fibre Channel networking device 500, and the Fibre Channel networking engine 504 in the networking device 500 receiving the PLOGI(s) via its communication system 508. The Fibre Channel networking engine 504 in the networking device 500 may then perform PLOGI acknowledgment (PLOGI ACK) operations 925 that may include generating and transmitting PLOGI ACK(s) via its communication system 508 to the target device 206*a*/400, and the target engine 404 in the target device 206*a*/400 receiving the PLOGI ACK(s) via its communication system 408, which one of skill in the art in possession of the present disclosure will recognize operate to log the target WWPNs 806*a*, 806*b*, 806*c*, and up to 806*d* into a port.

As discussed in further detail below, after a host NQN and a target NQN perform PLOGI operations with a Fibre Channel networking device (i.e., a name server provided by that Fibre Channel networking device), the host NQN will perform name server query operations to determine the targets in its zone and, and with that information the host NQN will log into a corresponding target port. Furthermore, all host NQN World Wide Names (WWNs) may be zoned with the target controller devices NQN WWN, so the first login may be to the port for the target controller device. Following the port login discussed above, the target NQNs 702*a*, 702*b*, 702*c*, and up to 702*d* included in the target device 206*a*/400 may register their types (e.g., NVMe), features (e.g., discovery controller, target), and other NQN details that would be apparent to one of skill in the art in possession of the present disclosure. One of skill in the art in possession of the present disclosure will appreciate that the host NQN/target NQN PLOGI operations are asynchronous, and thus may all occur at the same time or at different times while remaining within the scope of the present disclosure as well.

As will be appreciated by one of skill in the art in possession of the present disclosure, subsequent to block 606, blocks 608-612 may be performed for each host NQN/host WWPN in the host device 202/300. Thus, in the specific example provided in the discussion below, a first iteration of the method 600 is performed for the host NQN 700*a* in the host device 202, a second iteration of the method 600 is performed for the host NQN 700*b* in the host device 202, a third iteration of the method 600 is performed for the host NQN 700*b* in the host device 202, and up to an nth iteration of the method 600 is performed for the host NQN 700*d* in the host device 202.

The method 600 may then proceed to block 608 where the Fibre Channel networking device(s) perform port login operations for a host WWPN associated with a host NQN in the host device. With reference to FIG. 9B, at block 606 and in this first iteration of the method 600, the host engine 304 in the host device 202/300 may perform PLOGI operations 926 for the host WWPN 804*a* associated with the host NQN 700*a* included in the host device 202/300, which may include generating and transmitting PLOGI(s) via its communication system 308 to a name server provided by the Fibre Channel networking device 500, and the Fibre Channel networking engine 504 in the networking device 500 receiving the PLOGI(s) via its communication system 508. The Fibre Channel networking engine 504 in the networking device 500 may then perform PLOGI ACK operations 927 that may include generating and transmitting PLOGI ACK(s) via its communication system 508 to the host device 202/300, and the host engine 304 in the host device 202/300 receiving the PLOGI ACK(s) via its communication system 308, which one of skill in the art in possession of the present disclosure will recognize operate to log the host WWPN 804*a* into a port.

As discussed above, after a host NQN and a target NQN perform PLOGI operations with a Fibre Channel networking device (i.e., a name server provided by that Fibre Channel networking device), the host NQN will perform name server query operations to determine the targets in its zone and, and with that information the host NQN will log into a corresponding target port. Furthermore, all host NQN World Wide Names (WWNs) may be zoned with the target controller devices NQN WWN, so the first login may be to the port for the target controller device. Following the port login discussed above, the host NQN 700*a* included in the host device 202/300 may register its type (NVMe), features (e.g., hosts), and other NQN details that would be apparent to one of skill in the art in possession of the present disclosure.

The method 600 then proceeds to block 610 where the host NQN in the host device retrieves target details for a target NQN in the target device that is zoned for communication with that host NQN. With reference back to FIG. 9B, in an embodiment of block 610 in this first iteration of the method 600, the host engine 304 in the host device 202/300 may perform controller query operations 928 for the host NQN 700*a* that operate to request target controller device details for a target controller device in a target device that the host NQN 700*a* is allowed to communicate with, which may include generating and transmitting a controller query via its communication system 308 to the Fibre Channel networking device 500, and the Fibre Channel networking engine 504 in the networking device 500 receiving the controller query via its communication system 508. The Fibre Channel networking engine 504 in the networking device 500 may then perform controller query response operations 930 that may include using the zoning information in its Fibre Channel networking database 506 to determine that the host NQN 700*a* is zoned to communicate with the target NQN 702*a* (e.g., via the "HWWPN 804*a*/TWWPN 806*a*" zoning information discussed above) that is associated with the target controller device 406 in the target device 206*a*/400, retrieving target controller device details associated with the target controller device 406 (e.g., a host query for type: NVMe feature: discovery controller), and transmitting a controller query response that includes those target controller device details via its communication system 508 to the host device 202/300, and the host engine 304 in the host device 202/300 receiving the controller query response via its communication system 308.

The method 600 then proceeds to block 612 where the host NQN in the host device connects to the target NQN in the target device using the target details. With reference back to FIG. 9B, in an embodiment of block 612 and during this first iteration of the method 600, the host engine 304 in the host device 202/300 may perform controller connect operations 932 that include generating a controller connect communication for the host NQN 700*a* using the target controller device details received at block 610, transmitting the controller connect communication via its communication system 308 and through the Fibre Channel network 204 to the target device 206*a*/400, and the target engine 404 in the target device 206*a*/400 receiving the controller connect communication via its communication system 408. The target engine 404 in the target device 206*a*/400 may then communicate with the target controller device 406 associated with the target NQN 702a to perform controller connect acknowledgment operations 934 that may include transmitting a controller connect acknowledgment via its communication system 408 to the host device 202/300, and the host engine 304 in the host device 202/300 receiving the controller connect acknowledgment via its communication system 308. As will be appreciated by one of skill in the art in possession of the present disclosure, the controller connect/ controller connect acknowledgment operations discussed above may include the host engine 304 in the host device 202/300 creating queues (e.g., I/O queues, administrative queues, etc.) and/or performing any other operations that result in connection of the host NQN 700a and the target NQN 702a (e.g., by logging the host NQN 700a into the target NQN 702a/target controller device 406), with each of the host NQN 700a and target NQN 702a configured to utilize their respective communication sessions (e.g., FDISC sessions provided via the FDISC operations as discussed above) for NVMe layer transactions with each other.

The method 600 then proceeds to decision block 614 where the method proceeds depending on whether the current iteration of the method 600 has connected a host NQN to a target controller device. As discussed below, the connection of a host NQN to a target controller device in the target device allows that host NQN to retrieve target NQNs for target subsystems in that target device, which allows other host NQNs in the host device to log into respective target NQNs/target subsystems in the target device. As such, if the host NQN has logged into a target controller device during a current iteration of the method 600, then target NQNs for target subsystems are then retrieved, while if the host NQN was not logged into a target device during a current iteration of the method 600 (i.e., that host NQN was logged into a target subsystem), the target NQNs for target subsystems have already been retrieved and host NQNs should be logged into those target NQNs.

Thus, if at decision block 614 the host NQN has connected to the target controller device during the current iteration of the method 600, the method 600 proceeds to block 616 where the host NQN in the host device retrieves target NQN(s) in the target device from the target controller device. In an embodiment, at block 616 during this first iteration of the method 600 and following the logging in of the host NQN 700a to the target NQN 702a, the host engine 304 in the host device 202/300 may perform get log operations 936 that may include generating a get log request that requests target NQNs that are accessible to its host NQNs 700b, 700c, and up to 700d, and transmits the get log request via its communication system 308 and through the Fibre Channel network 204 to the target device 206a/400, with the target engine 404 in the target device 206a/400 receiving the get log request via its communication system 408. The target engine 404 in the target device 206a/400 may then communicate with the target controller device 406 to retrieve log page details that identify the target NQNs 702b, 702c, and up to 702d that are associated with the target subsystems 408a, 408b, and up to 408c, and performing get log response operations 938 that may include transmitting a get log response that includes the log page details via its communication system 408 to the host device 202/300, and the host engine 304 in the host device 202/300 receiving the get log response via its communication system 308. As discussed in further detail below, the log page details in the get log response identify the target NQNs 702b, 702c, and up to 702d that are associated with the target subsystems 408a, 408b, and up to 408c in the target device 206a/400 that are accessible to the host device 202/300.

Following block 616, or if at decision block 614 the host NQN did not connect to the target controller device during the current iteration of the method 600, the method 600 proceeds to decision block 618 where the method 600 proceeds depending on whether there are more host NQN/target NQN pairs to connect. As discussed above, following the retrieval of the target NQNs associated with target subsystems from the target device, the host device will operate to log host NQNs into those target NQNs until there are no more host NQN/target NQN pairs to connect.

Figure 9C:
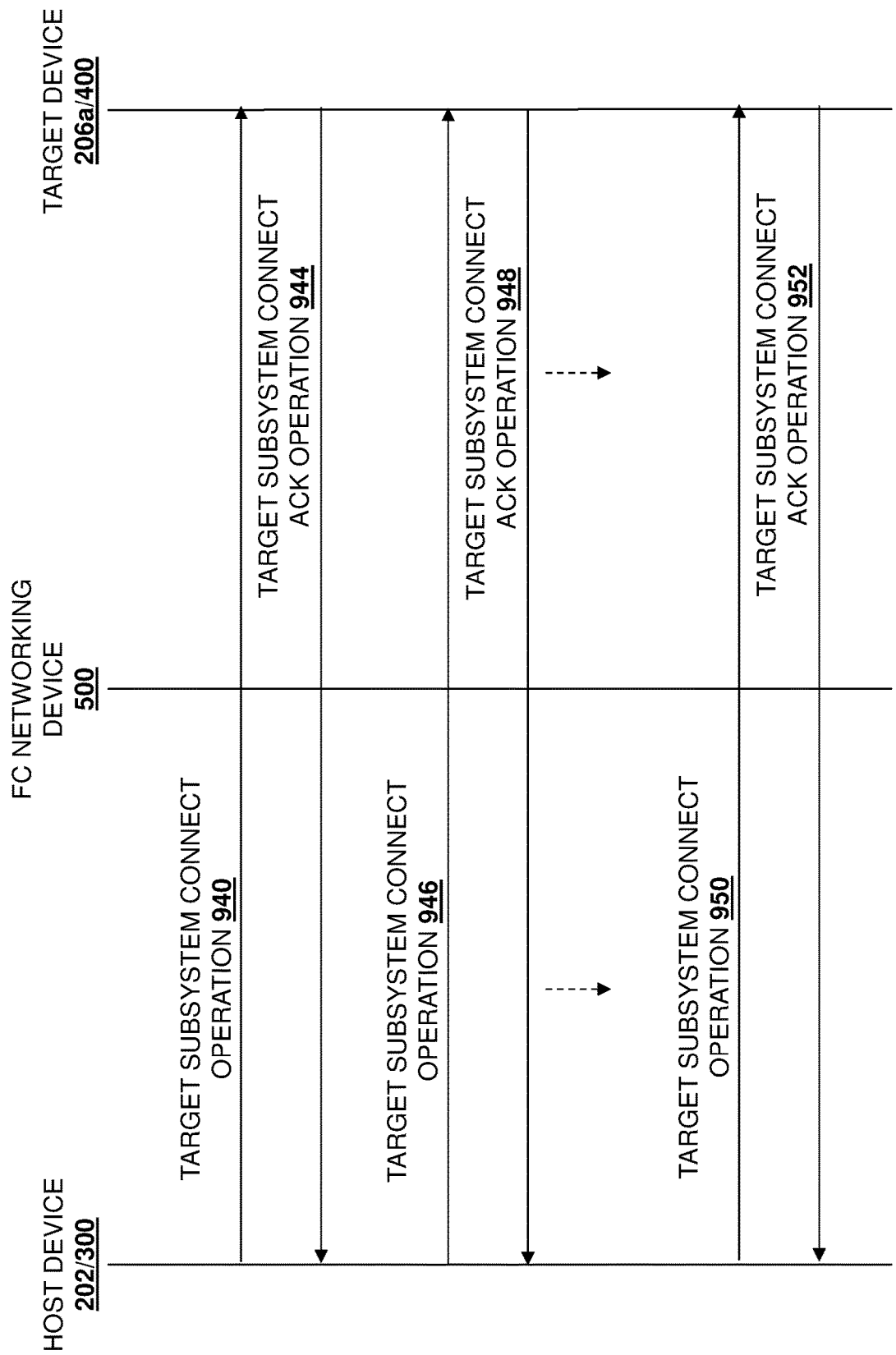
FIG. 9C is a portion of a swim lane diagram illustrating an embodiment of the networked system of FIG. 2 operating during the method of FIG. 6.

As such, if at decision block 618 there are more host NQN/target NQN pairs to connect, the method proceeds to block 620 and then returns to block 608. In this example, on a second iteration of the method 600, the host engine 304 in the host device 202/300 may identify the target NQN 702b for the host NQN 700b in the log page details of the get log response at block 620, the Fibre Channel networking device(s) may perform PLOGI operations for the host WWPN 804b associated with the host NQN 700b in the host device 202/300 to log that host WwPN 804b into a port at block 608, and the host device 202/300 may retrieve the target details for the target NQN 702b that is zoned for communication with the host NQN 700b at block 610. The host device 202/300 may then connect the host NQN 700b to the target NQN 702b (e.g., by logging the host NQN 700b into the target NQN 702b, creating queues, etc.) at block 612 via the target subsystem connection operations 940 and target subsystem connect acknowledgment operations 944 illustrated in FIG. 9C, with each of the host NQN 700b and target NQN 702b configured to utilize their respective communication sessions (e.g., FDISC sessions provided via the FDISC operations as discussed above) for NVMe layer transactions with each other. In this second iteration of the method 600, the host NQN 700b is not connected to a target controller device, so the method 600 proceeds to decision block 618 where it is determined that there are more host NQN/target NQN pairs to connect.

Continuing with this example, on a third iteration of the method 600, the host engine 304 in the host device 202/300 may identify the target NQN 702c for the host NQN 700c in the log page details of the get log response at block 620, the Fibre Channel networking device(s) may perform PLOGI operations for the host WWPN 804c associated with the host NQN 700c in the host device 202/300 to log that host WWPN 804c into a port at block 608, and the host device 202/300 may retrieve the target details for the target NQN 702c that is zoned for communication with the host NQN 700c at block 610. The host device 202/300 may then connect the host NQN 700c to the target NQN 702c (e.g., by logging the host NQN 700c into the target NQN 702c, creating queues, etc.) at block 612 via the target subsystem connection operations 946 and target subsystem connect acknowledgment operations 948 illustrated in FIG. 9C, with each of the host NQN 700c and target NQN 702c configured to utilize their respective communication sessions (e.g., FDISC sessions provided via the FDISC operations as discussed above) for NVMe layer transactions with each other. In this third iteration of the method 600, the host NQN 700c is not connected to a target controller device, so the method 600 proceeds to decision block 618 where it is determined that there are more host NQN/target NQN pairs to connect.

As will be appreciated by one of skill in the art in possession of the present disclosure, the method 600 will continue to loop as discussed above until, on an nth iteration of the method 600, the host engine 304 in the host device 202/300 may identify the target NQN 702d for the host NQN 700d in the log page details of the get log response at block 620, the Fibre Channel networking device(s) may perform PLOGI operations for the host WWPN 804d associated with the host NQN 700d in the host device 202/300 to log that host WWPN 804d into a port at block 608, and the host device 202/300 may retrieve the target details for the target NQN 702d that is zoned for communication with the host NQN 700d at block 610. The host device 202/300 may then connect the host NQN 700d to the target NQN 702d (e.g., by logging the host NQN 700d into the target NQN 702d, creating queues, etc.) at block 612 via the target subsystem connection operations 950 and target subsystem connect acknowledgment operations 952 illustrated in FIG. 9C, with each of the host NQN 700d and target NQN 702d configured to utilize their respective communication sessions (e.g., FDISC sessions provided via the FDISC operations as discussed above) for NVMe layer transactions with each other. At decision block 618 on this nth iteration of the method 600 there are no more host NQN/target NQN pairs to connect, and the method 600 ends at block 622.

Thus, systems and methods have been described that provide a respective host WWPN for each host NQN included in a host device, and a respective target WWPN for each target NQN included in a target device, which allows a Fibre Channel fabric to perform respective logins for each host WWPN and target WWPN, and utilize zoning information to provide respective communication sessions for host NQN/target NQN pairs that allows those host NQN/target NQN pairs to communicate securely with each other. For example, the secure Fibre Channel NVMe fabric communications system of the present disclosure includes a host device having host WWPNs associated with each of its host NQNs, an NVMe target device having a target WWPNs associated with each of its target NQNs, and FC networking device(s) that couple the host device to the NVMe target device. The FC networking device(s) perform, for each host WWPN associated with the host NQNs, host login operations that register the host NQN for that host WWPN as an NVMe host, and perform, for each target WWPN associated with the target NQNs, target login operations that register the target NQN associated with that target WWPN as an NVMe target. The FC networking device(s) then provide, to the host for each host NQN, target NQN details for target NQN(s) zoned for communication with that host NQN to allow respective communication session(s) to be established between the host NQN and those target NQN(s). As such, different NQNs may utilize different Fibre Channel communication sessions to stop unauthorized access across different host/target NQN pairs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure Fibre Channel Non-Volatile Memory express (NVMe) fabric communications system, comprising:
a host device that includes a host chassis having a host physical port, wherein the host device has been configured with a plurality of first host Non-Volatile Memory express (NVMe) Qualified Names (NQNs) that are each accessible via the host physical port and that have each been provided with a respective host NQN World Wide Port Name (WWPN);
an NVMe target device that has an NVMe target device chassis including a target physical port and housing a plurality of target subsystems that are each accessible via the target physical port and that have each been configured with a respective first target NQN and provided with a respective target NQN WWPN associated with that first target NQN; and
a Fibre Channel fabric that couples the host device to the NVMe target device, wherein the Fibre Channel fabric includes at least one Fibre Channel networking device that is configured to:
store, in a Fibre Channel networking database, zoning information that includes a respective zoning entry for each of a plurality of host NQN/target NQN pairs that is configured to zone that host NQN/target NQN pair for communication with each other, wherein each respective zoning entry uniquely maps the host physical port, a respective first host NQN configured on the host physical port, a respective first host NQN WWPN provided for that respective first host NQN, the target physical port, a respective first target NQN configured on the target physical port, and a respective first target NQN WWPN provided for that respective first target NQN;
perform, with the host device for each host NQN WWPN associated with the plurality of first host NQNs configured on the host device, host login operations that register the first host NQN associated with that host NQN WWPN as an NVMe host;
perform, with the NVMe target device for each target NQN WWPN associated with the respective first target NQN configured for each of the plurality of target subsystems housed in the NVMe target device chassis, target login operations that register the first target NQN associated with that target NQN WWPN as an NVMe target; and
provide, to the host device for each of the plurality of first host NQNs configured on the host device and based on the zoning information that was stored in the Fibre Channel networking database, target NQN details for one or more first target NQNs that are configured for respective target subsystems housed in the NVMe target device chassis and that are zoned for communication with that first host NQN, wherein the target NQN details are configured to allow each of the plurality of first host NQNs configured on the host device to establish a respective communication session with the one or more first target NQNs that are configured for respective target subsystems housed in the NVMe target device chassis and that are zoned for communication with that first host NQN, while preventing that first host NQN from accessing target subsystems that are not zoned for communication with that first host NQN.

2. The system of claim 1, wherein the host login operations include:
a fabric login (FLOGI) operation that registers a first of the plurality of first host NQNs associated with a first host WWPN as a first NVMe host; and
at least one fabric discovery (FDISC) operation that registers at least one second of the plurality of first host NQNs associated with at least one second host WWPN as at least one second NVMe host.

3. The system of claim 1, wherein the target login operations include:

a fabric login (FLOGI) operation that registers a first of the plurality of first target NQNs associated with a first target WWPN as a first NVMe target; and at least one fabric discovery (FDISC) operation that registers at least one second of the plurality of first target NQNs associated with at least one second target WWPN as at least one second NVMe target.

4. The system of claim 1, wherein the host physical port has been provided with a second host NQN that is associated with a respective host physical port WWPN, and the target physical port has been provided with a second target NQN that is associated with a respective target physical port WWPN.

5. The system of claim 1, wherein the at least one Fibre Channel networking device is configured to:

perform, with the host device for each of the plurality of first host NQNs configured on the host device, port login operations that log each first host NQN into a name server subsystem; and perform, with the NVMe target device for each respective first target NQN that is configured for each of the plurality of target subsystems housed in the NVMe target device chassis, port login operations that log each first target NQN into the name server subsystem.

6. The system of claim 1, wherein the plurality of target subsystems housed in the NVMe target device chassis includes a target controller device, and wherein the target NQN details for the one or more first target NQNs that are configured on the NVMe target device and that are zoned for communication with that first host NQN include target controller NQN details for the target controller device, and wherein the target controller NQN details are configured to allow a first of the plurality of host NQNs configured on the host device to establish a respective communication session with the target controller device that is zoned for communication with the first of the plurality of host NQNs, and retrieve one or more target subsystem NQN details for respective target subsystems that are housed in the NVMe target device chassis.

7. The system of claim 6, wherein host device is configured to:

request, via the first of the plurality of host NQNs and from the target controller device using the target controller NQN details, a log page that includes the one or more target subsystem NQN details for the respective target subsystems that are housed in the NVMe target device chassis; and receive, via the first of the plurality of host NQNs and from the target controller device, a log page response that includes the one or more target subsystem NQN details for the respective target subsystems that are housed in the NVMe target device chassis.

8. An Information Handling System (IHS), comprising:
a processing system; and
a memory system that is coupled to the processing system and that includes instructions that, when executed by the processing system, cause the processing system to provide a Fibre Channel networking engine that is configured to:

store, in a Fibre Channel networking database, zoning information that includes a respective zoning entry for each of a plurality of host Non-Volatile Memory express (NVMe) Qualified Name (NQN)/target NQN pairs that is configured to zone that host NQN/target NQN pair for communication with each other, wherein each respective zoning entry uniquely maps a host physical port, a first host NQN configured on the host physical port, a respective first host NQN World Wide Port Name (WWPN) provided for that first host NQN, a target physical port, a respective first target NQN configured on the target physical port, and a respective first target NQN WWPN provided for that first target NQN;

perform, with a host device that includes a host chassis having the host physical port and that has been configured with a plurality of the first host NQNs that are each accessible via the host physical port and that have each been provided with one of the respective host NQN WWPN, host login operations for each host NQN WWPN associated with the plurality of first host NQNs configured on the host device, wherein the host login operations register the first host NQN associated with that host NQN WWPN as an NVMe host;

perform, with an NVMe target device that has an NVMe target device chassis including the target physical port and housing a plurality of target subsystems that are each accessible via the target physical port and that have each been configured with one of the respective first target NQNs and provided with a one of the respective target NQN WWPNs associated with that respective first target NQN, target login operations for each target NQN WWPN associated with the respective first target NQN configured for each of the plurality of target subsystems housed in the NVMe target device chassis, wherein the target login operations register the first target NQN associated with that target NQN WWPN as an NVMe target; and provide, to the host device for each of the plurality of first host NQNs configured on the host device and based on the zoning information that was stored in the Fibre Channel networking database, target NQN details for one or more first target NQNs that are configured for respective target subsystems housed in the NVMe target device chassis and that are zoned for communication with that first host NQN, wherein the target NQN details are configured to allow each of the plurality of first host NQNs configured on the host device to establish a respective communication session with the one or more first target NQNs that are configured for respective target subsystems housed in the NVMe target device chassis and that are zoned for communication with that first host NQN, while preventing that first host NQN from accessing target subsystems that are not zoned for communication with that first host NQN.

9. The IHS of claim 8, wherein the host login operations include:

a fabric login (FLOGI) operation that registers a first of the plurality of first host NQNs associated with a first host WWPN as a first NVMe host; and at least one fabric discovery (FDISC) operation that registers at least one second of the plurality of first host NQNs associated with at least one second host WWPN as at least one second NVMe host.

10. The IHS of claim 8, wherein the target login operations include:

a fabric login (FLOGI) operation that registers a first of the plurality of first target NQNs associated with a first target WWPN as a first NVMe target; and at least one fabric discovery (FDISC) operation that registers at least one second of the plurality of first target NQNs associated with at least one second target WWPN as at least one second NVMe target.

11. The IHS of claim 8, wherein the host physical port has been provided with a second host NQN that is associated with a respective host physical port WWPN, and the target physical port has been provided with a second target NQN that is associated with a respective target physical port WWPN.

12. The IHS of claim 8, wherein the Fibre Channel networking engine is configured to:
perform, with the host device for each of the plurality of first host NQNs configured on the host device, port login operations that log each first host NQN into a name server subsystem; and
perform, with the NVMe target device for each respective first target NQN that is configured for each of the plurality of target subsystems housed in the NVMe target device chassis, port login operations that log each first target NQN into the name server subsystem.

13. The IHS of claim 8, wherein the plurality of target subsystems housed in the NVMe target device chassis includes a target controller device, and wherein the target NQN details for the one or more first target NQNs that are configured on the NVMe target device and that are zoned for communication with that first host NQN include target controller NQN details for the target controller device, and wherein the target controller NQN details are configured to allow a first of the plurality of host NQNs configured on the host device to establish a respective communication session with the target controller device that is zoned for communication with the first of the plurality of host NQNs, and retrieve one or more target subsystem NQN details for respective target subsystems that are housed in the NVMe target device chassis.

14. A method for secure Fibre Channel NVMe fabric communications, comprising:
storing, in a Fibre Channel networking database, zoning information that includes a respective zoning entry for each of a plurality of host Non-Volatile Memory express (NVMe) Qualified Name (NQN)/target NQN pairs that is configured to zone that host NQN/target NQN pair for communication with each other, wherein each respective zoning entry uniquely maps a host physical port, a first host NQN configured on the host physical port, a respective first host NQN World Wide Port Name (WWPN) provided for that first host NQN, a target physical port, a respective first target NQN configured on the target physical port, and a respective first target NQN WWPN provided for that first target NQN;
performing, by at least one Fiber Channel networking device with a host device that includes a host chassis having the host physical port and that has been configured with a plurality of the first host NQNs that are each accessible via the host physical port and that have each been provided with a one of the respective host NQN WWPNs, host login operations for each host NQN WWPN associated with the plurality of first host NQNs configured on the host device, wherein the host login operations register the first host NQN associated with that host NQN WWPN as an NVMe host;
performing, by the at least one Fiber Channel networking device with an NVMe target device that has an NVMe target device chassis including the target physical port and housing a plurality of target subsystems that are each accessible via the target physical port and that have each been configured with one of the respective first target NQNs and provided with one of the respective target NQN WWPNs associated with that respective first target NQN, target login operations for each target NQN WWPN associated with the respective first target NQN configured for each of the plurality of target subsystems housed in the NVMe target device chassis, wherein the target login operations register the first target NQN associated with that target NQN WWPN as an NVMe target; and
providing, by the at least one Fiber Channel networking device to the host device for each of the plurality of first host NQNs configured on the host device and based on the zoning information that was stored in the Fibre Channel networking database, target NQN details for one or more first target NQNs that are configured for respective target subsystems housed in the NVMe target device chassis and that are zoned for communication with that first host NQN, wherein the target NQN details are configured to allow each of the plurality of first host NQNs configured on the host device to establish a respective communication session with the one or more first target NQNs that are configured for respective target subsystems housed in the NVMe target device chassis and that are zoned for communication with that first host NQN, while preventing that first host NQN from accessing target subsystems that are not zoned for communication with that first host NQN.

15. The method of claim 14, wherein the host login operations include:
a fabric login (FLOGI) operation that registers a first of the plurality of first host NQNs associated with a first host WWPN as a first NVMe host; and
at least one fabric discovery (FDISC) operation that registers at least one second of the plurality of first host NQNs associated with at least one second host WWPN as at least one second NVMe host.

16. The method of claim 14, wherein the target login operations include:
a fabric login (FLOGI) operation that registers a first of the plurality of first target NQNs associated with a first target WWPN as a first NVMe target; and
at least one fabric discovery (FDISC) operation that registers at least one second of the plurality of first target NQNs associated with at least one second target WWPN as at least one second NVMe target.

17. The method of claim 14, host physical port has been provided with a second host NQN that is associated with a respective host physical port WWPN, and the target physical port has been provided with a second target NQN that is associated with a respective target physical port WWPN.

18. The method of claim 14, further comprising:
performing, by the at least one Fiber Channel networking device with the host device for each of the plurality of first host NQNs configured on the host device, port login operations that log each first host NQN into a name server subsystem; and
performing, by the at least one Fiber Channel networking device with the NVMe target device for each respective first target NQN that is configured for each of the plurality of target subsystems housed in the NVMe target device chassis, port login operations that log each first target NQN into the name server subsystem.

19. The method of claim 14, wherein the plurality of target subsystems housed in the NVMe target device chassis includes a target controller device, and wherein the target NQN details for the one or more first target NQNs that are configured on the NVMe target device and that are zoned for communication with that first host NQN include target controller NQN details for the target controller device, and wherein the target controller NQN details are configured to allow a first of the plurality of first host NQNs configured on the host device to establish a respective communication session with the target controller device that is zoned for communication with the first of the plurality of first host NQNs, and retrieve one or more target subsystem NQN details for respective target subsystems that are housed in the NVMe target device chassis.

20. The method of claim 19, further comprising:
- requesting, by the host device via the first of the plurality of first host NQNs and from the target controller device using the target controller NQN details, a log page that includes the one or more target subsystem NQN details for the respective target subsystems that are housed in the NVMe target device chassis; and
- receiving, by the host device via the first of the plurality of first host NQNs and from the target controller device, a log page response that includes the one or more target subsystem NQN details for the respective target subsystems that are housed in the NVMe target device chassis.

\* \* \* \* \*